United States Patent
Zhou (10) Patent No.: US 9,154,419 B2
(45) Date of Patent: Oct. 6, 2015

(54) TRAFFIC FORWARDING IN A LAYER 2 EDGE NETWORK

(71) Applicant: Hangzhou H3C Technologies Co., Ltd., Hangzhou, Zhejiang (CN)

(72) Inventor: Wan Zhou, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/373,879

(22) PCT Filed: Jun. 18, 2013

(86) PCT No.: PCT/CN2013/077372
§ 371 (c)(1),
(2) Date: Jul. 22, 2014

(87) PCT Pub. No.: WO2014/008802
PCT Pub. Date: Jan. 16, 2014

(65) Prior Publication Data
US 2015/0016462 A1 Jan. 15, 2015

(30) Foreign Application Priority Data
Jul. 10, 2012 (CN) .......................... 2012 1 0236710

(51) Int. Cl.
*H04L 12/741* (2013.01)
*H04L 12/46* (2006.01)
*H04L 12/721* (2013.01)

(52) U.S. Cl.
CPC .............. *H04L 45/74* (2013.01); *H04L 12/465* (2013.01); *H04L 12/4633* (2013.01); *H04L 12/4666* (2013.01); *H04L 12/4675* (2013.01); *H04L 45/12* (2013.01); *H04L 45/66* (2013.01)

(58) Field of Classification Search
CPC . H04L 12/28; H04L 12/2858; H04L 12/2869; H04L 12/4633; H04L 12/4641; H04L 12/4666; H04L 12/4679; H04L 12/5689; H04L 12/5692; H04L 12/5696; H04L 12/66; H04L 45/04; H04L 45/22; H04L 45/66; H04L 49/15; H04L 49/602; H04L 49/604; H04L 12/465; H04L 45/12; H04L 45/74

USPC ......... 370/389, 392, 397, 400, 401, 409, 465, 370/467, 469, 474, 475
See application file for complete search history.

(56) References Cited

U.S. PATENT DOCUMENTS 7,801,123 B2     9/2010  Dharanikota et al.
2002/0191572 A1* 12/2002 Weinstein et al. ............ 370/338
(Continued)

FOREIGN PATENT DOCUMENTS

CN    101848161      9/2010
WO    WO2008/125603  10/2008

OTHER PUBLICATIONS

International Search Report and Written Opinion dated Sep. 19, 2013 issued on PCT Patent Application No. PCT/CN2013/077372 dated Jun. 18, 2013, The State Intellectual Property Office. P.R China.

*Primary Examiner* — Un C Cho
*Assistant Examiner* — Jeremy Costin
(74) *Attorney, Agent, or Firm* — Mannava & Kang, P.C.

(57) ABSTRACT

Methods and network devices are provided for forwarding a message in a layer 2 edge network that includes an access server device connected to sender and gateway devices. Forwarding information including destination IP address, destination MAC address, destination VLAN ID and destination device ID is established. A message is received by the access server device from the sender device. The message includes first destination MAC address, first destination IP address, first destination VLAN ID, and first destination device ID. When the first destination MAC address of a received message is a MAC address of the gateway device, the received message is forwarded according to the first destination MAC address, first destination VLAN ID and first destination device ID. Otherwise the message is modified and forwarded according to second destination MAC address, second destination VLAN ID, and second destination device ID determined to be associated with the first destination IP address.

13 Claims, 6 Drawing Sheets

(56) References Cited

U.S. PATENT DOCUMENTS

2012/0014386 A1* 1/2012 Xiong et al. .................. 370/392
2012/0106347 A1* 5/2012 Allan et al. .................... 370/238
2012/0281700 A1* 11/2012 Koganti et al. ............... 370/392
2013/0003738 A1* 1/2013 Koganti et al. ............... 370/392

* cited by examiner

TRAFFIC FORWARDING IN A LAYER 2 EDGE NETWORK

CROSS-REFERENCE TO RELATED APPLICATION

The present application is a 371 application of International Application No. PCT/CN2013/077372 filed on Jun. 18, 2013 and entitled "Traffic Forwarding in a Layer 2 Edge Network," which claims benefit of Chinese Patent App. No. CN 201210236710.5 filed on Jul. 10, 2012.

BACKGROUND

A data centre edge network serves as a boundary to the data centre. The edge network is connected to host devices or servers on one side, and to an edge router that serves as an outgoing interface to an external network on the other side. A first-hop gateway of the edge network may implement a redundancy protocol for establishing a fault-tolerant gateway, such as VRRP (Virtual Router Redundancy Protocol), HSRP (Hot Standby Route Protocol) etc. The fabric core of an edge network may be implemented as a layer 2 virtual private network (L2VPN). In this case, from a global perspective, the L2VPN domain may be viewed as a single virtual device such as a layer 3 switch.

Traffic forwarding within a layer 2 network of a data centre may use any suitable network protocol such as SPB (Shortest Path Bridge), TRILL (Transparent Interconnection of lots of link), VPLS (Virtual Private Label Switch) etc. These techniques support layer 2 traffic forwarding according to ECMP (Equal Cost Multi Path), shortest path and transparent switching. Internal layer 2 traffic forwarding is by way of L2VPN forwarding between physical devices. Layer 2 and layer 3 forwarding is performed via the edge network.

BRIEF DESCRIPTION OF DRAWINGS

By way of examples, the present disclosure will be described with reference to the following drawings, in which.

DETAILED DESCRIPTION

Figure 1:
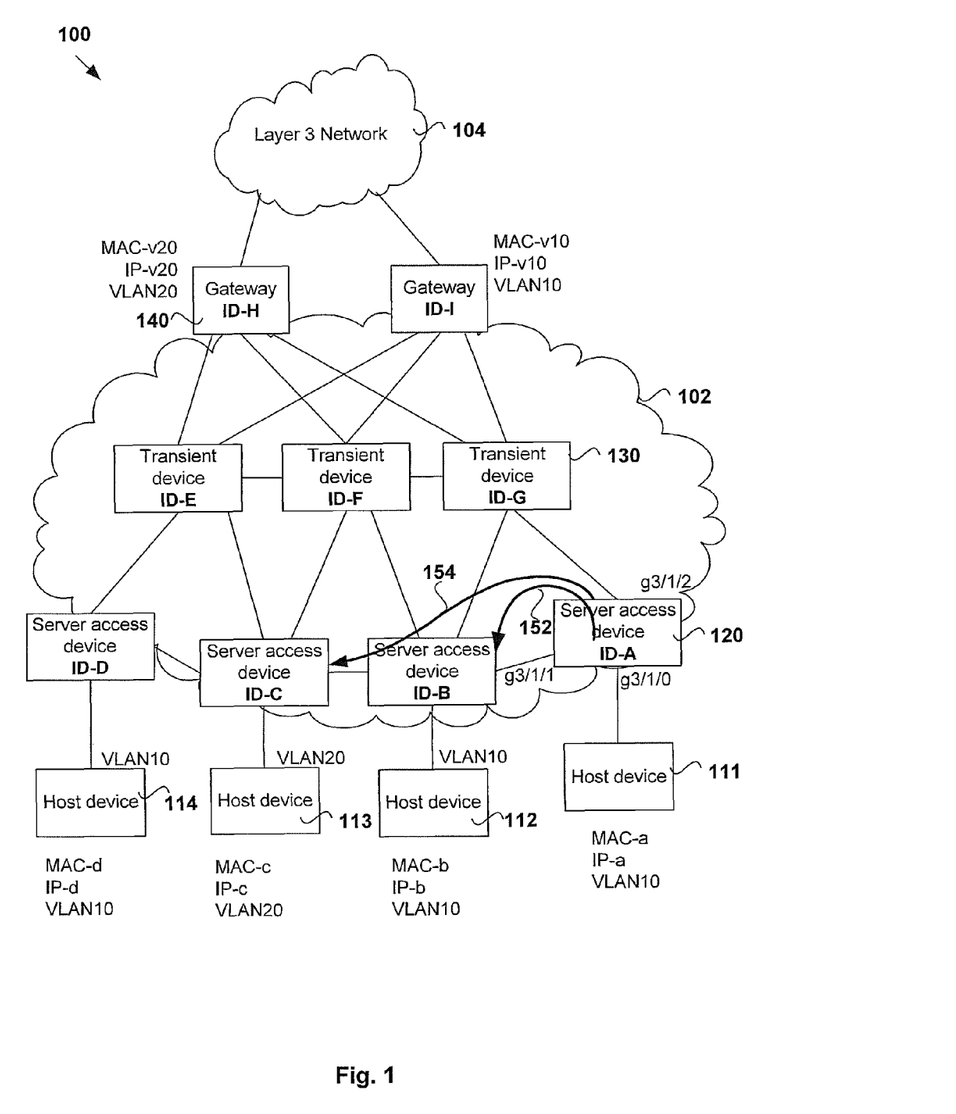
FIG. 1 is a schematic diagram of an example network environment for traffic forwarding in a layer 2 edge network.

In an edge network such as in FIG. 1, traffic forwarding may require a gateway device. When sender host device 111 on VLAN10 sends a message to recipient host device 113 on VLAN20, the sender host device 111 first sends it to access server device ID-A, which then forwards the message to gateway device ID-I via intermediate device ID-G. The message is then forwarded by gateway device ID-I to server access device ID-C via intermediate device ID-F before reaching recipient host device 113.

The present disclosure describes traffic forwarding in a layer 2 edge network that includes an access server device connected to a sender device and a gateway device. Instead of forwarding from ID-A to ID-C via gateway device ID-I, the present disclosure facilitates traffic forwarding using a shorter forwarding path between sender host device 111 and recipient host device 113, i.e. via ID-B (see path 154 in FIG. 1) and without relying on the gateway device.

In one example, forwarding information is established prior to receiving a message. The forwarding information includes information of destination IP address, destination media access control (MAC) address, destination virtual local area network identifier VLAN ID and destination device ID. A message is then received from a sender device, the message including first destination MAC address, first destination IP address, first destination VLAN ID, and first destination device ID.

It is then determined whether the first destination MAC address of a received message is a MAC address of the gateway device.

If the first destination MAC address is determined not to be the MAC address of the gateway device, the received message is forwarded according to the first destination MAC address, first destination VLAN ID and first destination device ID.

Otherwise, if the first destination MAC address is determined to be the MAC address of the gateway device, second destination MAC address, second destination VLAN ID and second destination device ID associated with the first destination IP address are determined based on the forwarding information. The message is then modified and forwarded according to the second destination MAC address, second destination VLAN ID, and second destination device ID.

According to the above, forwarding information is established to facilitate traffic forwarding along a path that does not involve a gateway device, for example in the case of inter-VLAN traffic forwarding. This facilitates shortest hop forwarding (SHF), which is more efficient and reduces delay.

Examples will be described with reference to the accompanying drawings. In more detail, FIG. 1 is a schematic diagram of an example network environment 100 for traffic forwarding in a layer 2 edge network 102 that includes:

Access server devices 120 (e.g. ID-A, ID-B, ID-C and ID-D) that connect servers or host devices (e.g. host devices 111, 112, 113, and 114) to the edge network 102. An access server device 120 may also be referred to as an access server node (ASN).

Gateway devices 140 (e.g. ID-H and ID-I) that connect to an external network 104, such as layer 3 network etc. A gateway device 130 may also be referred to as a network router node (NRN).

Transient or intermediate devices 130 (e.g. ID-E, ID-F and ID-G) that connect the access server devices 120 with the gateway devices 140 for traffic forwarding in the layer 2 edge network 102.

The backbone core or fabric core of the edge network 102 may implement any suitable network protocol, such as SPB, TRILL, VPLS etc. A device identification or ID (e.g. ID-A to ID-I in FIG. 1) refers to a nickname of the device in the case of TRILL, MAC address of the device in the case of SPB and VPLS label in the case of VPLS.

The devices 110, 120, 130 and 140 are connected to each other via their respective outgoing interfaces. In the example in FIG. 1, three outgoing interfaces of access server device ID-A are shown: ID-A is connected to ID-B via outgoing interface 'g3/1/1', transient device ID-G via 'g3/1/2', and host device 111 via 'g3/1/0'.

Host devices (or servers) 111, 112, 113 and 114 are connected to the edge network 102 via access server devices ID-A, ID-B, ID-C and ID-D respectively. Host devices 111, 112 and 114 belong to VLAN10, while host device 113 belongs to VLAN20. Both VLANs are configured with shortest hop forwarding. The host devices 111, 112, 113 and 114 have the following address information:

| Host Device | IP address | MAC address | VLAN ID |
|---|---|---|---|
| 111 | IP-a | MAC-a | VLAN10 |
| 112 | IP-b | MAC-b | VLAN10 |
| 113 | IP-c | MAC-c | VLAN20 |
| 114 | IP-d | MAC-d | VLAN10 |

Access server devices ID-A, ID-B, ID-C and ID-D are connected to gateway devices ID-H and ID-I via transient devices ID-E, ID-F and ID-G. The gateway devices 140 have the following address information:

| Device ID | IP address | MAC address | VLAN ID |
|---|---|---|---|
| ID-H | IP-v20 | MAC-v20 | VLAN20 |
| ID-I | IP-v10 | MAC-v10 | VLAN10 |

VLAN10 and VLAN20 are enabled or configured with SHF which generally refers to traffic forwarding to a destination via the lowest number of hops. For example, in the case of VLAN10, gateway device ID-I is configured as a 'master' gateway device while gateway device ID-H as a 'backup' gateway device for VLAN20. Master gateway device ID-I is responsible for generating forwarding information, calculating paths, forwarding traffic and responding to address resolution protocol (ARP) requests for VLAN10. The backup gateway device serves as a backup, ready to assume the role of master should the current master fails.

In one example, a 'sender device' such as a host device on a VLAN (e.g. 111 on VLAN10) sends a message via an ingress access server device (e.g. ID-A). There are several possible scenarios:

In a first example scenario (see 152 in FIG. 1), the message from the sender host device (e.g. 111 on VLAN10) is for a destination host device on the same VLAN (e.g. 112 on VLAN10). In this case, the message includes a first destination MAC address (e.g. MAC-b), first destination IP address (e.g. IP-b), first destination VLAN ID (e.g. VLAN10) and first destination device ID (e.g. ID-B) associated with the destination host device (e.g. 112).

In a second example scenario (see 154 in FIG. 1), the message from the sender host device (e.g. 111 on VLAN10) is for a recipient host device on a different VLAN (e.g. 113 on VLAN20). In this case, the message includes a first destination IP address of the recipient host device (e.g. IP-c), and first destination MAC address (e.g. MAC-v10 of ID-I), first destination VLAN ID (e.g. VLAN10) and first destination device ID (e.g. ID-I) of a gateway device.

In the second example scenario, since the destination MAC address of the message is the MAC address of a gateway device (e.g. ID-I), the message is conventionally forwarded by the access server device (e.g. ID-A) to the gateway device (e.g. ID-I) before being forwarded to the host device (e.g. 113) via other devices (e.g. ID-F and ID-C).

Figure 2:
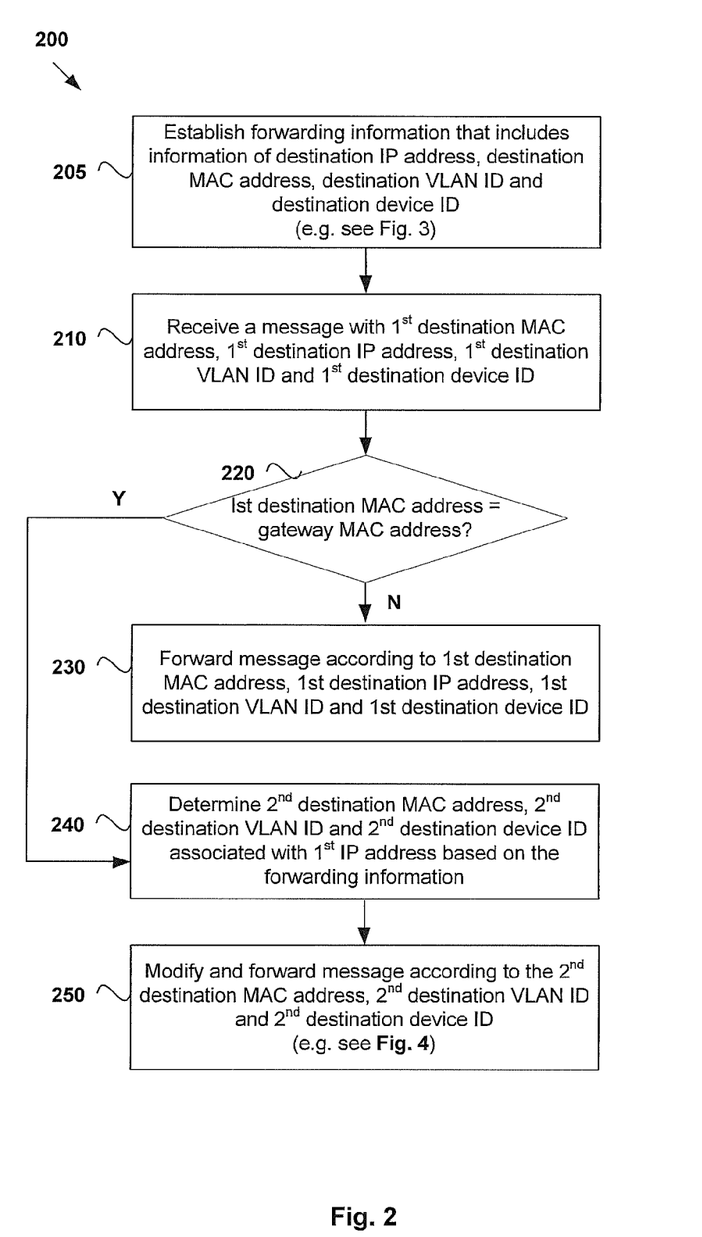
FIG. 2 is a flowchart of an example method for traffic forwarding in a layer 2 edge network.

FIG. 2 shows an example method for traffic forwarding in a layer 2 edge network 102 according to the present disclosure. The example method may be performed by an access server device (e.g. ID-A) in the edge network 102.

At block 205, forwarding information is established prior to receiving a message. The forwarding information includes information of destination IP address, destination MAC address, destination VLAN ID and destination device ID.

At block 210, a message is received by the access server device (e.g. ID-A). The message includes a first destination MAC address, first destination IP address, first destination VLAN ID and first destination device ID.

At block 220, it is determined whether the first destination MAC address is a MAC address of a gateway device (e.g. ID-I).

In the first example scenario (see 152 in FIG. 1), the first destination MAC address of the received message is MAC-b of host device 112, i.e. not a MAC address of a gateway device. In this case, at block 230, the access service device (e.g. ID-A) forwards the received message according to the first destination MAC address (e.g. MAC-b), VLAN ID (e.g. VLAN10) and device ID (e.g. ID-B).

In the second example scenario (see 154 in FIG. 1), the first destination MAC address is MAC-v10, i.e. the MAC address of gateway device ID-I. In this case, at block 240, the access service device (e.g. ID-A) determines a second destination MAC address (e.g. MAC-c), second destination device ID (e.g. ID-C) and second destination VLAN ID (e.g. VLAN20) associated with the first IP address (e.g. IP-c).

At block 250, the access service device (e.g. ID-A) modifies and forwards the received message according to the second destination MAC address (e.g. MAC-c), second destination device ID (e.g. ID-C) and second VLAN ID (e.g. VLAN20) associated with the first IP address (e.g. IP-c).

The example method facilitates shortest hop forwarding, which is more efficient and reduces delay during traffic forwarding. In the second example scenario, it is not necessary for the access server device (e.g. ID-A) to forward the received message via a gateway device (e.g. ID-I) although, in this example, the message is for a host device on a different VLAN in the edge network 102.

Forwarding Information

Figure 3:
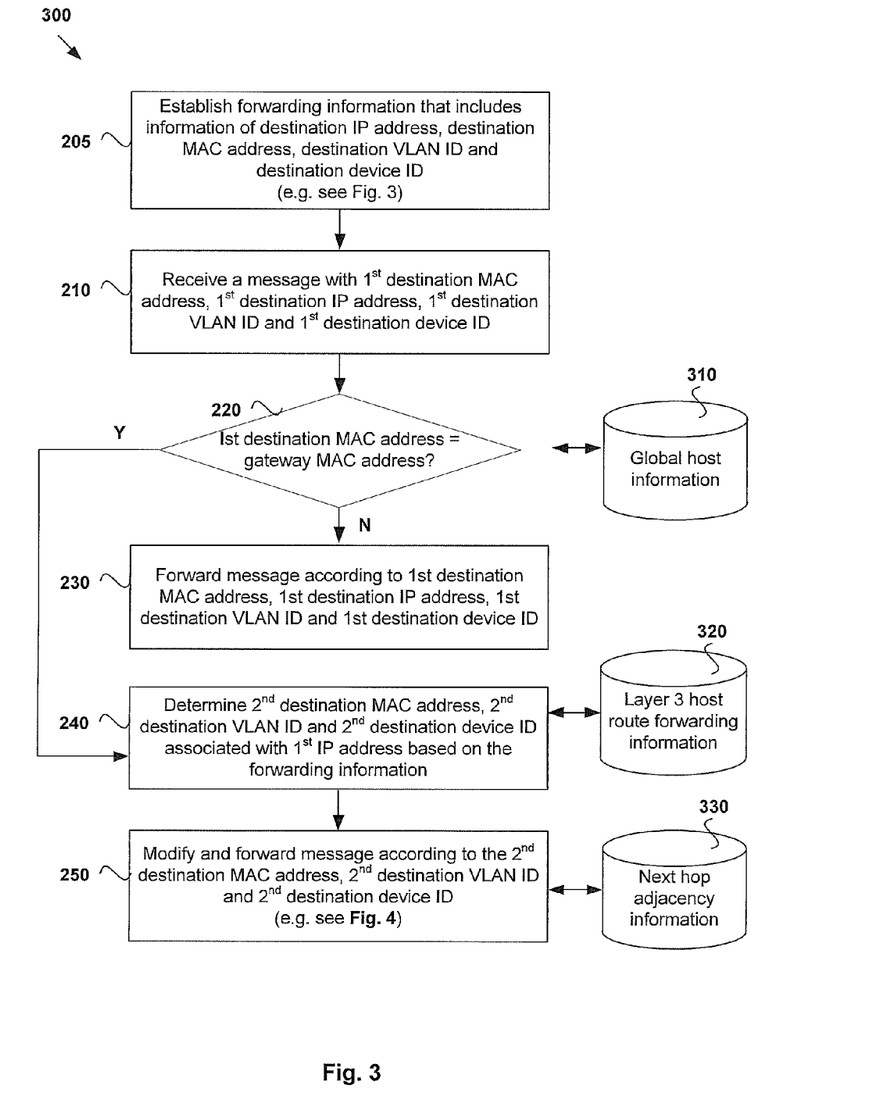
FIG. 3 is a flowchart of the example method in FIG. 2, further illustrating forwarding information that may be used for traffic forwarding in a layer 2 edge network.

FIG. 3 shows some examples of the forwarding information that may be established at block 205 in FIG. 2.

Global host information 310 may be established for the determination at block 220 in FIG. 3, i.e. whether the first destination MAC address of the received message is a MAC address of a gateway device. This may involve looking up the first destination MAC address in the global host information 310.

Layer 3 host route forwarding information 320 may be established for the determination at block 240, i.e. the second destination MAC address, second destination VLAN ID and second destination device ID associated with the first destination IP address. This may involve looking up the first destination IP address in the layer 3 host route forwarding information 320 to obtain the second destination MAC address, second destination VLAN ID and second destination device ID.

Next hop adjacency information 330 for forwarding the message at block 250, i.e. according to the first destination IP address, second destination MAC address, second destination VLAN ID and second destination device ID. This may involve looking up the second destination device ID in the next hop adjacency information 330. The next hop adjacency information 330 may be established based on L2VPN forwarding information of the edge network 102, which represents the global topology of the network.

The information may be gathered, sent and received using any suitable interior gateway protocol (IGP), such as Intermediate-System to Intermediate System (ISIS), Open Shortest Path Forwarding (OSPF) etc.

Although some examples are provided below, it will be appreciated that the different types of information may be combined or divided in any suitable way. For example, a single combined table may be created to include the global host information 310, layer 3 host route forwarding information and next hop adjacency information.

L2VPN forwarding information may include information relating to layer 2 forwarding within the edge network 102. Entries may be in the form of (destination device ID, next hop device ID, outgoing interface label). In the example in FIG. 1, the L2VPN forwarding information table established at device ID-A may include:
- (ID-B, ID-B, g3/1/1),
- (ID-C, ID-B, g3/1/1),
- (ID-F, ID-B, g3/1/1),
- (ID-F, ID-G, g3/1/2), etc.

The entries specify that ID-A is connected to destination device ID-B via interface 'g3/1/1'; destination device ID-C via next-hop device ID-B and interface 'g3/1/1'; destination device ID-F via next-hop device ID-B and interface 'g3/1/1'; and destination device ID-F via next-hop device ID-G and interface 'g3/1/2'.

An example global host information (310 in FIG. 3) may include address information relating to host devices 111, 112, 113, 114 and gateway devices 140 in the edge network 102. Entries may be in the form of (MAC address, IP address, Device ID, VLAN ID, Device type). For example, the global host information table established at device ID-A may include:

Host entries:
- (MAC-a, IP-a, ID-A, VLAN10, Host)
- (MAC-b, IP-b, ID-B, VLAN10, Host)
- (MAC-c, IP-c, ID-C, VLAN20, Host)
- (MAC-d, IP-d, ID-D, VLAN10, Host)

Gateway entries:
- (MAC-v20, IP-v20, ID-H, VLAN20, GW)
- (MAC-v10, IP-v10, ID-I, VLAN10, GW)

'Host' and 'GW' refer to the device type, i.e. host device or gateway device. The 'Host' entries include address information of host devices 111, 112, 113, 114 while 'GW' entries include address information of gateway devices ID-H and ID-I. In FIG. 1, device ID-I serves as a master gateway device and device ID-H serves as a backup gateway device for VLAN10. The master gateway device gathers and sends the information of the host devices and gateway devices to each device on the edge network 102.

The 'Host' entries may be established based on ARP information received from a master gateway device (e.g. ID-I). The master gateway device (e.g. ID-I) performs ARP learning and synchronization for the host devices (e.g. 111, 112, 113 and 114), and sends an ARP table to each device on the network 102. Entries of the ARP table may be in the form of (IP address, VLAN ID, device ID of an ingress access server device).

The 'GW' entries may be established based on information of gateway devices received from the master gateway device (e.g. ID-I). The information includes VLAN ID of each VLAN enabled with shortest hop forwarding; MAC address of a master gateway device; MAC address of backup gateway device; and device ID.

An example layer 3 host route forwarding information (320 in FIG. 3) may include entries in the form of (Destination IP address, Destination MAC address, Destination VLAN ID, Destination Device ID). The layer 3 host routing forwarding table may be established based on the L2VPN forwarding information and global host information. For example, the layer 3 host routing forwarding table established at device ID-A may include ('N/A' represents an empty field):
- (IP-a, MAC-a, VLAN10, N/A)
- (IP-b, MAC-b, VLAN10, ID-B)
- (IP-c, MAC-c, VLAN20, ID-C)
- (IP-d, MAC-d, VLAN10, ID-D)
- (IP-v20, MAC-v20, VLAN20, ID-H)
- (IP-v10, MAC-v10, VLAN10, ID-I)

The master gateway device (e.g. ID-I) also establishes and synchronizes next hop adjacency information for all devices in the network. Each device receives the next hop adjacency information through IGP, and establishes local next hop adjacency information. Entries of the next hop adjacency information (330 in FIG. 3) may be in the form of (Destination device ID, MAC address of next hop device, VLAN ID of next hop device, Outgoing interface of next hop device).

Using the next hop adjacency information, an access server device (e.g. ID-A) is able to determine the MAC address, VLAN ID and outgoing interface of the next hop device based on a destination device ID for forwarding the message.

Traffic Forwarding

Figure 4:
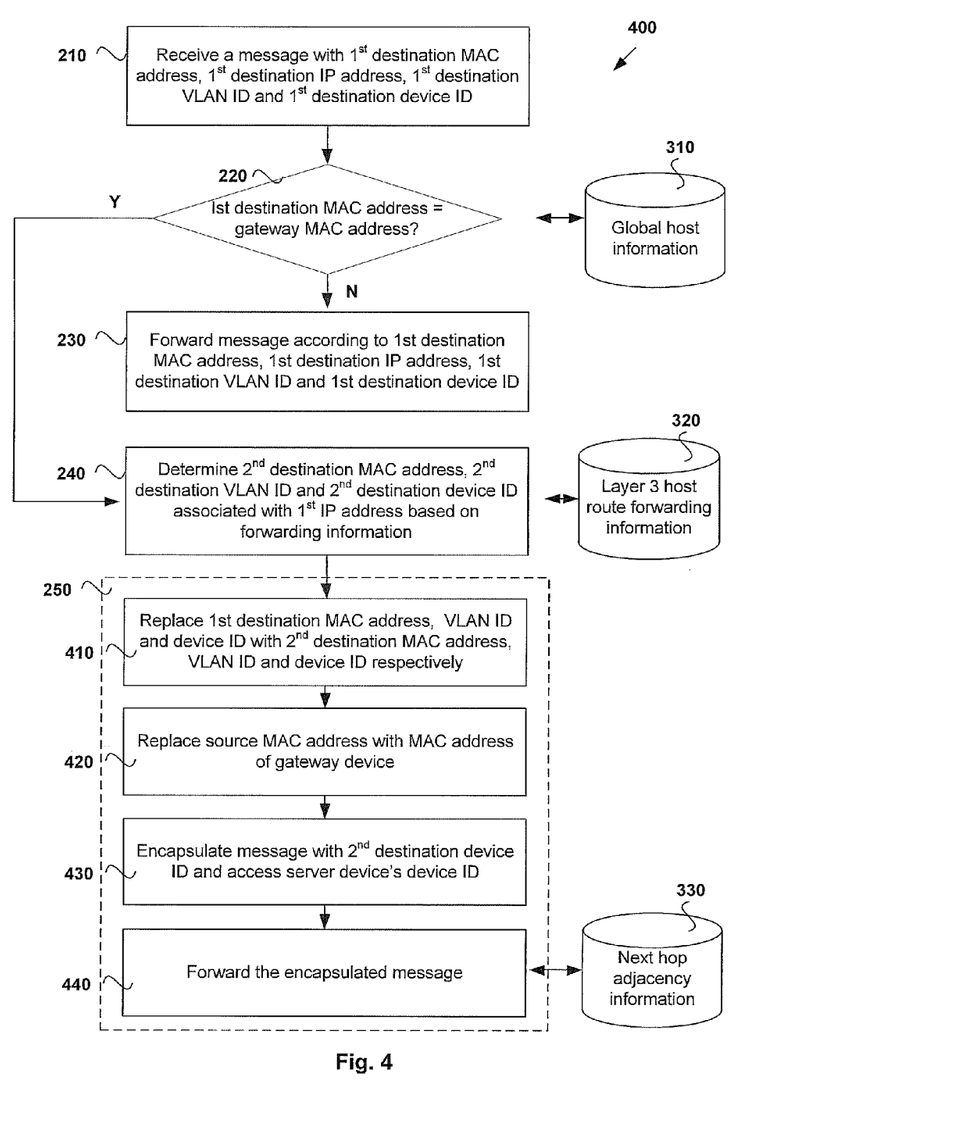
FIG. 4 is a flowchart of the example method in FIG. 3, further illustrating an example implementation for modifying and forwarding a message in a layer 2 edge network.

Referring also to FIG. 4, an example implementation of block 252 in FIG. 2 is shown. Block 205 is not shown again for simplicity. In this case, forwarding the message according to the second destination MAC address, second destination VLAN ID and second destination device ID determined from the layer 3 routing forwarding may further include the following.

At block 410, the access server device (e.g. ID-A) replaces the first destination MAC address with the second destination MAC (e.g. MAC-v10 replaced with MAC-c), first destination VLAN ID with the second destination VLAN ID (e.g. VLAN10 replaced with VLAN20) and first destination device ID with second destination device ID (e.g. ID-I replaced with ID-C).

At block 420, the access server device (e.g. ID-A) replaces source MAC address with the MAC address of the gateway device (e.g. MAC-a replaced with MAC-v10). This means when the recipient host device (e.g. 113) responds, the destination MAC address of the response message would be set to the MAC address of the gateway device.

At block 430, the access server device (e.g. ID-A) encapsulates the received message according to the second destination device ID (e.g. ID-C) and a device ID of the access server device (e.g. ID-A).

At block 440, the access server device (e.g. ID-A) forwards the encapsulated message to the second destination device ID (e.g. ID-C) according to its associated next hop adjacency information. For example, for ID-A to reach ID-C, the next hop device ID is ID-B and the outgoing interface is 'g3/1/1'.

Based on the above example, the message is sent from ID-A to ID-C via ID-B before reaching host device 113. Messages sent by host device 113 on VLAN20 to host device 111 on VLAN10 are forwarded in a similar way without first sending it to gateway device ID-H.

Default Routing Information

Figure 5:
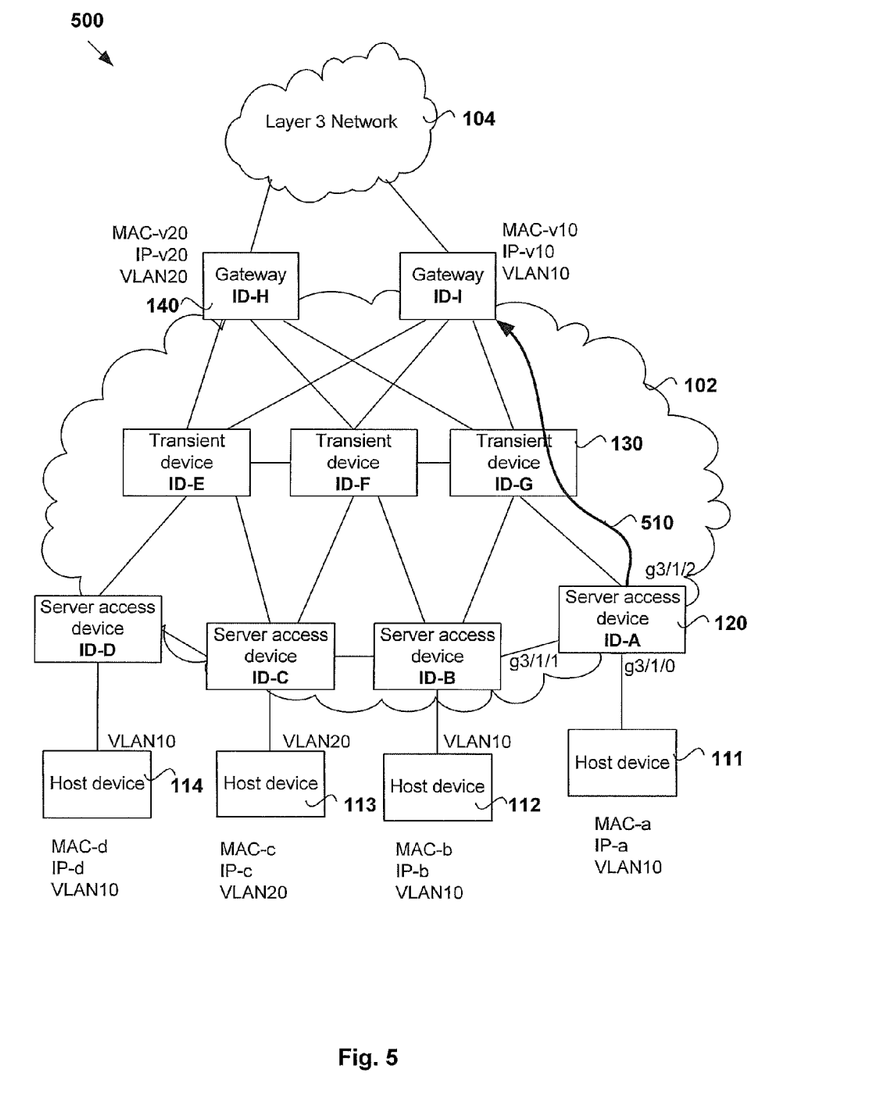
FIG. 5 is a schematic diagram of the example network environment in FIG. 1, further illustrating the forwarding of a message to an external network.

In a third example scenario (see 510 in FIG. 5), the message from the sender host device (e.g. 111 on VLAN10) may be for a recipient that is not on the edge network 102. In this case, the message includes first destination MAC address (e.g. MAC-v10 of ID-I), first destination VLAN ID (e.g. VLAN10) and first destination device ID (e.g. ID-I) of a gateway device. However, since the recipient is not on the edge network 102, its IP address would not be stored and therefore cannot be found in the layer 3 host forwarding information 320.

To facilitate traffic forwarding to a recipient on an external network via a gateway device, each access server device (e.g. ID-A) may further establish default routing information, for example at block 205 in FIG. 2. The default routing information may be established based on the L2VPN forwarding information table and global host information table. The default routing information may include entries in the form of (Destination IP address, Destination MAC address, Destination VLAN ID, Destination device ID) for each VLAN ID in the network 102. For example, the default routing information table established at device ID-A may include:

(0, N/A, N/A, ID-I) for VLAN10
(0, N/A, N/A, ID-H) for VLAN20

In this case, the access server device (e.g. ID-A) first determines, from the default routing information, the destination gateway device ID (e.g. ID-I) based on the first destination VLAN ID (e.g. VLAN10) in the received message. The message is then encapsulated according to the destination gateway device ID (e.g. ID-I) and device ID of the access server device (e.g. ID-A).

The access server device (e.g. ID-A) then looks up the next hop adjacency information for the destination gateway device ID (e.g. ID-I) in the next hop adjacency information 330. For example, for ID-A to reach ID-I, the next hop device ID is ID-G and the outgoing interface is 'g3/1/2'.

Network Device 600

Figure 6:
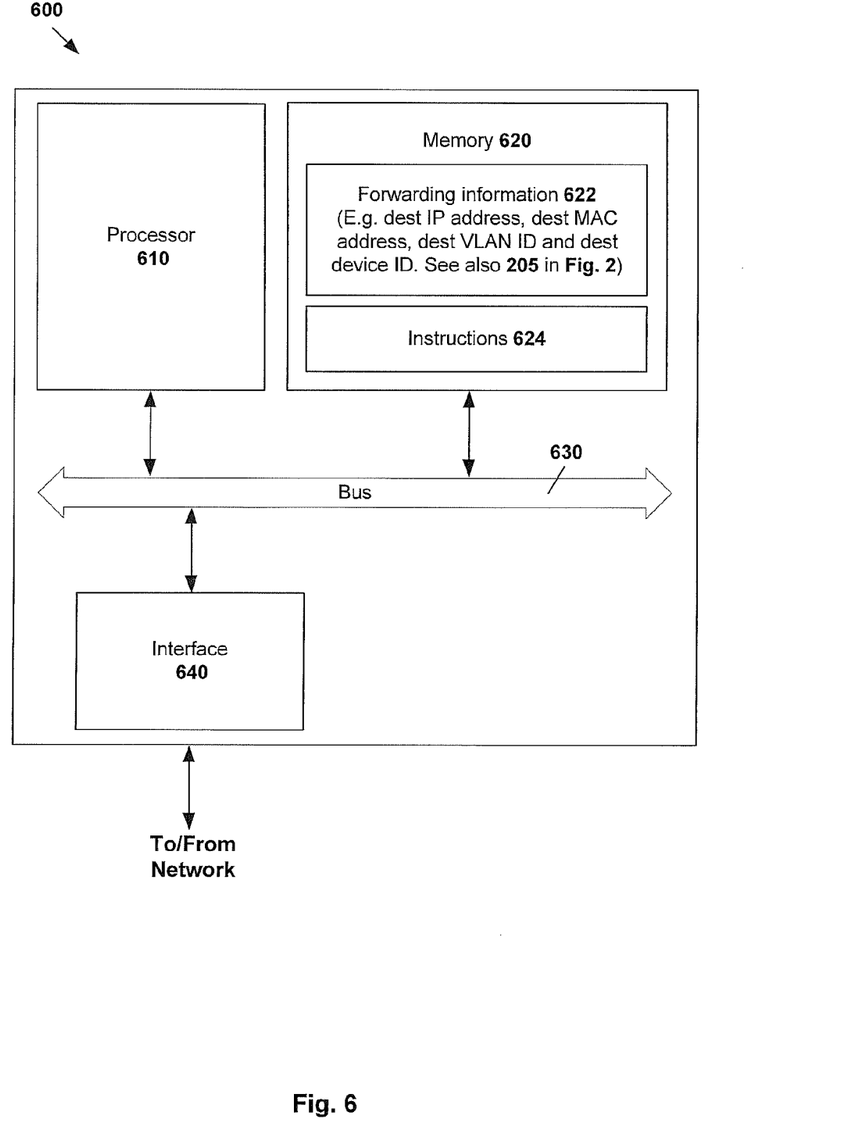
FIG. 6 is an example structure of a network device capable of acting as an access server device.

The above examples can be implemented by hardware, software or firmware or a combination thereof. Referring to FIG. 6, an example network device 600 capable of acting as an access server device 120 in the edge network 102 in FIG. 1 is shown.

The example network device 600 includes a processor 610, a memory 620 and a network interface device 640 that communicate with each other via bus 630. The memory 620 stores any necessary forwarding information 622 and machine-readable instructions 624 to perform any of the processes described in the present disclosure.

The processor 610 is further to perform processes described herein. In one example, the processor 610 is to:

Establish forwarding information that includes information of destination IP address, destination media access control (MAC) address, destination virtual local area network identifier VLAN ID and destination device ID.

Receive, from the sender device, a message with first destination media access control (MAC) address, first destination IP address, first destination virtual local area network identifier (VLAN ID), and first destination device ID.

Determine whether the first destination MAC address of a received message is not a MAC address of the gateway device.

If the first destination MAC address is determined not to be the MAC address of the gateway device, forward the received message according to the first destination MAC address, first destination VLAN ID and first destination device ID.

Otherwise, if the first destination MAC address is determined to be the MAC address of the gateway device, determine second destination MAC address, second destination VLAN ID and second destination device ID associated with the first destination IP address based on the forwarding information, and modify and forward the message according to the second destination MAC address, second destination VLAN ID, and second destination device ID.

The forwarding information 622 in the memory 620 may be established according to block 205 in FIG. 2 and include information of destination IP address, destination MAC address, destination VLAN ID and destination device ID. Referring to FIG. 3 again, examples of the forwarding information 622 may include global host information 310, layer 3 host route forwarding information 320, next hop adjacency information 330 and any combination thereof.

The memory 620 may store machine-readable instructions 624 to cause the processor 610 to perform processes described herein. The network device 600 in FIG. 6 may include units to perform the processes described herein. In one example, the network device 600 may include a receiving unit, determining unit, establishing unit, looking up unit and processing unit to perform the processes described herein.

The methods, processes and functional units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors 610; reference in this disclosure or the claims to a 'processor' should thus be interpreted to mean 'one or more processors'.

Although one network interface device 640 is shown in FIG. 6, processes performed by the network interface device 640 may be split among multiple network interface devices (not shown for simplicity). As such, reference in this disclosure to a 'network interface device' should be interpreted to mean 'one or more network interface devices".

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for forwarding a message in a layer 2 edge network that includes an access server device connected to a sender device and a gateway device, the method comprising the access server device:
    establishing forwarding information that includes information of destination IP address, destination media access control (MAC) address, destination virtual local area network identifier VLAN ID and destination device ID;
    receiving, from the sender device, a message with first destination media access control (MAC) address, first destination IP address, first destination virtual local area network identifier (VLAN ID), and first destination device ID; determining whether the first destination MAC address of a received message is not a MAC address of the gateway device;
    if the first destination MAC address is determined not to be the MAC address of the gateway device, forwarding the received message according to the first destination MAC address, first destination VLAN ID and first destination device ID;
    otherwise, if the first destination MAC address is determined to be the MAC address of the gateway device, determining second destination MAC address, second destination VLAN ID and second destination device ID associated with the first destination IP address based on the forwarding information;
    replacing the first destination MAC address with second destination MAC address, first destination VLAN ID with second destination VLAN ID, and first destination device ID with the second destination device ID;
    replacing a source MAC address of the received message with the MAC address of the gateway device;
    encapsulating the received message according to the second destination device ID and a device ID of the access server device; and
    forwarding the encapsulated message according to next hop adjacency information associated with the second destination device ID.

2. The method of claim 1, wherein:
    the forwarding information comprises layer 3 host route forwarding information that includes information of destination IP address, destination MAC address, destination VLAN ID and destination device ID; and
    determining the second destination MAC address, second destination VLAN ID and second destination device ID further comprises looking up the first destination IP address in the layer 3 host route forwarding information to determine the associated second destination MAC address, second destination VLAN ID and second destination device ID.

3. The method of claim 2, wherein the layer 3 host route forwarding information is established based on global host information and layer 2 virtual private network (L2VPN) forwarding information.

4. The method of claim 3, wherein the forwarding information comprises global host information established based on information received from a master gateway device of a VLAN in the layer 2 edge network, the global host information including:
    a host entry established according to address resolution protocol (ARP) information received from the master gateway device, the ARP information including an IP address, MAC address, VLAN ID and device ID of an ingress access server device of a host device; and
    a gateway entry established according to VLAN ID of a VLAN enabled with shortest path forwarding, MAC addresses of a master gateway device and a backup gateway device and device ID received from the master gateway device.

5. The method of claim 3, wherein the method further comprises:
    establishing default routing information based on the global host information and L2VPN forwarding information;
    if the first destination IP address is not found in the layer 3 host route forwarding information, determining a device ID of gateway device, encapsulating the received message according to the device ID gateway device and device ID of the access server device and forwarding the encapsulated message according to next hop adjacency information based on the device ID of the gateway device.

6. The method of claim 1, wherein:
    if a backbone core of the layer 2 edge network is a Transparent Interconnect of Lots of Links (TRILL) network, the destination device ID is a nickname of a destination device;
    if a backbone core of the layer 2 edge network is a Shortest Path Bridging (SPB) network, the destination device ID is a MAC address of a destination device; and
    if a backbone core of the layer 2 edge network is a Virtual Private Label Switch (VPLS) network, the destination device ID is a VPLS label of a destination device.

7. A network device for forwarding a message in a layer 2 edge network, wherein the network device is to be connected to a sender device and a gateway device, the network device comprising:
    a processor: a memory on which is stored machine readable instructions that are to cause the processor to:
    establish forwarding information that includes information of destination IP address, destination media access control (MAC) address, destination virtual local area network identifier VLAN ID and destination device ID;
    receive, from the sender device, a message with first destination media access control (MAC) address, first destination IP address, first destination virtual local area network identifier (VLAN ID), and first destination device ID;
    determine whether the first destination MAC address of a received message is not a MAC address of the gateway device;
    if the first destination MAC address is determined not to be the MAC address of the gateway device, forward the received message according to the first destination MAC address, first destination VLAN ID and first destination device ID;
    otherwise, if the first destination MAC address is determined to be the MAC address of the gateway device, determine second destination MAC address, second destination VLAN ID and second destination device ID associated with the first destination IP address based on the forwarding information:
    replace the first destination MAC address with second destination MAC address, first destination VLAN ID with second destination VLAN ID, and first destination device ID with the second destination device ID;
    replace a source MAC address of the received message with the MAC address of the gateway device;
    encapsulate the received message according to the second destination device ID and a device ID of the network device; and forward the encapsulated message according to next hop adjacency information associated with the second destination device ID.

8. The network device of claim 7, wherein the machine readable instructions are further to cause the processor to:
   establish layer 3 host route forwarding information that includes information of destination IP address, destination MAC address, destination VLAN ID and destination device ID; and
   determine the second destination MAC address, second destination VLAN ID and second destination device ID by looking up the first destination IP address in the layer 3 host route forwarding information to determine the associated second destination MAC address, second destination VLAN ID and second destination device ID.

9. The network device of claim 8, wherein the machine readable instructions are further to cause the processor to establish the layer 3 host route forwarding information based on global host information and layer 2 virtual private network (L2VPN) forwarding information.

10. The network device of claim 9, wherein machine readable instructions are further to cause the processor to establish the global host information based on information received from a master gateway device of a VLAN in the layer 2 edge network, the global host information including:
   a host entry established according to address resolution protocol (ARP) information received from the master gateway device, the ARP information including an IP address, MAC address, VLAN ID and device ID of an ingress access server device of a host device; and
   a gateway entry established according to VLAN ID of a VLAN enabled with shortest path forwarding, MAC addresses of a master gateway device and a backup gateway device and device ID received from the master gateway device.

11. The network device of claim 9, wherein machine readable instructions are further to cause the processor to:
   establish default routing information based on the global host information and L2VPN forwarding information; and
   if the first destination IP address is not found in the layer 3 host route forwarding information, determine a device ID of gateway device, encapsulate the received message according to the device ID gateway device and device ID of the access server device and forward the encapsulated message according to next hop adjacency information based on the device ID of the gateway device.

12. The network device of claim 7, wherein:
   if a backbone core of the layer 2 edge network is a Transparent Interconnect of Lots of Links (TRILL) network, the destination device ID is a nickname of a destination device;
   if a backbone core of the layer 2 edge network is a Shortest Path Bridging (SPB) network, the destination device ID is a MAC address of a destination device; and
   if a backbone core of the layer 2 edge network is a Virtual Private Label Switch (VPLS) network, the destination device ID is a VPLS label of a destination device.

13. A non-transitory computer readable storage medium on which is stored machine readable instructions that when executed by a processor of a network device are to cause the processor to:
   receive, from a sender device, a message with a first destination media access control (MAC) address, a first destination IP address, a first destination virtual local area network identifier (VLAN ID), and a first destination device ID;
   determine that the first destination MAC address of the received message is a MAC address of a gateway device;
   determine a second destination MAC address, a second destination VLAN ID and a second destination device ID associated with the first destination IP address based on forwarding information, replace the first destination MAC address with second destination MAC address, first destination VLAN ID with second destination VLAN ID, and first destination device ID with the second destination device ID;
   replace a source MAC address of the received message with the MAC address of the gateway device;
   encapsulate the received message according to the second destination device ID and a device ID of the network device; and forward the encapsulated message according to next hop adjacency information associated with the second destination device ID.

* * * * *